US008151129B2

(12) United States Patent
Sutardja

(10) Patent No.: US 8,151,129 B2
(45) Date of Patent: Apr. 3, 2012

(54) COMPUTER WITH LOW-POWER SECONDARY PROCESSOR AND SECONDARY DISPLAY

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 664 days.

(21) Appl. No.: 12/229,034

(22) Filed: Aug. 19, 2008

(65) Prior Publication Data

US 2008/0320321 A1    Dec. 25, 2008

Related U.S. Application Data

(63) Continuation of application No. 10/779,544, filed on Feb. 13, 2004, now Pat. No. 7,421,602.

(51) Int. Cl.
*G06F 1/32* (2006.01)
(52) U.S. Cl. .......................... 713/324; 713/300; 713/323
(58) Field of Classification Search ........................ None
See application file for complete search history.

(56) References Cited

U.S. PATENT DOCUMENTS

| | | | |
|---|---|---|---|
| 5,768,164 A | 6/1998 | Hollon, Jr. | |
| 7,428,650 B2 * | 9/2008 | Kardach et al. | 713/323 |
| 2002/0086719 A1 | 7/2002 | Kedia et al. | |
| 2002/0103951 A1 | 8/2002 | Huber et al. | |
| 2002/0129288 A1 | 9/2002 | Loh et al. | |
| 2003/0100963 A1 | 5/2003 | Potts et al. | |
| 2003/0135771 A1 | 7/2003 | Cupps et al. | |
| 2003/0188077 A1 | 10/2003 | Watts et al. | |
| 2003/0191972 A1 * | 10/2003 | Watts, Jr. | 713/300 |
| 2004/0225901 A1 | 11/2004 | Bear et al. | |
| 2005/0064911 A1 | 3/2005 | Chen et al. | |
| 2005/0066290 A1 | 3/2005 | Kee et al. | |
| 2006/0007051 A1 | 1/2006 | Bear et al. | |
| 2006/0129861 A1 | 6/2006 | Kee et al. | |

FOREIGN PATENT DOCUMENTS

| | | |
|---|---|---|
| CN | 1550951 | 12/2004 |
| EP | 0 667 579 A1 | 8/1995 |
| JP | 11086433 | 3/1999 |
| JP | 2002-007373 | 11/2002 |
| JP | 2002-073497 | 12/2002 |
| JP | 2003523571 | 8/2003 |
| JP | 2003-167656 | 11/2003 |

(Continued)

OTHER PUBLICATIONS

European Search Report dated Feb. 19, 2010 for European Patent Application No. 05 002 059.3 with correspondence of Mar. 2, 2010; 5 pages.

(Continued)

*Primary Examiner* — Dennis M Butler

(57) ABSTRACT

A computer having an active mode and an inactive mode includes a primary processor and a primary memory. A primary display is associated with the primary processor and the primary memory. The primary processor, the primary memory, and the primary display are operated when the computer is in the active mode and are powered down when the computer is in the inactive mode. A secondary processor dissipates less power than the primary processor. A secondary display communicates with the secondary processor. The secondary processor and the secondary display are powered up when the computer is in the inactive mode, and the secondary processor processes at least one of wireless network data and disk drive data when the computer is in each of the active mode and the inactive mode.

21 Claims, 11 Drawing Sheets

FOREIGN PATENT DOCUMENTS

| | | |
|---|---|---|
| JP | 2003-323417 | 11/2003 |
| TW | 451123 | 8/2001 |
| TW | 552499 | 9/2003 |
| WO | WO 02/100117 | 12/2002 |
| WO | WO 03/029943 | 4/2003 |
| WO | WO 03/083694 | 10/2003 |

OTHER PUBLICATIONS

Communication dated Apr. 26, 2010 for Application No. JP 2005-144894 with Non-Final Notice of Reasons for Rejection dated Apr. 20, 2010; 10 pages.

Communication dated Apr. 30, 2010 for Application No. JP 2005-209263 with Non-Final Notice of Reasons for Rejection dated Apr. 27, 2010; 8 pages.

Communication dated Apr. 30, 2010 for Application No. JP 2005-209264 with Non-Final Notice of Reasons for Rejection dated Apr. 27, 2010; 6 pages.

ANSI/IEEE Std. 802.11, 1999 Edition; Part 11: Wireless LAN Medium Access Cntrol (MAC) and Physical Layer (PHY) Specifications; Information technology—Telecommunications and information exchange between systems—Local and metropolitan area networks—Specific requirements; pp. 1-512.

IEEE P802.11g/D8.2 Apr. 2003 (Supplement to ANSI/IEEE std. 802.11 1999(Reaff 2003)) Draft Supplement Standard for Part 11: Wireless LAN Medium Access Cntrol (MAC) and Physical Layer (PHY) Specifications; Information technology—Telecommunications and information exchange between systems—Local and metropolitan area networks—Specific requirements; Further Higher Data Rate Extension in the 2.4 GHz Band; pp. 1-69.

IEEE Std. 802.11a-1999; Supplement to IEEE Standard for Information Technology—Telecommunications and information exchange between systems—Local and metropolitan area networks—Specific requirements; Part: 11 Wireless LAN Medium Access Control (MAC) and Physical Layer (PHY) specifications; High-speed Physical Layer in the 5 GHz Band; pp. 1-83.

IEEE Std. 802.11b; Supplement to IEEE Standard for Information technology—Telecommunications and information exchange between systems—Local and metropolitan area networks—Specific requirements; Part 11: Wireless LAN Medium Access Control (MAC) and Physical Layer (PHY) specifications: Higher-Speed Physical Layer Extension in the 2.4 GHz Band; Approved Sep. 16, 1999; pp. 1-89.

IEEE Std. 802.11b-1999/Cor Jan. 2001;IEEE Standard for Information technology—Telecommunications and information exchange between systems—Local and metropolitan area networks—Specific requirements; Part 11: Wireless LAN Medium Access Cntrol (MAC) and Physical Layer (PHY) Specifications; Amendment 2: Higher-speed Physical Layer (PHY) extension in the 2.4 GHz band—Corrigendum 1; pp. 1-15.

IEEE Std. 802.16; IEEE Standard for Local and metropolitan area networks; Part 16: Air Interface for Fixed Broadband Wireless Access Systems; Apr. 8, 2002; pp. 1-322.

IEEE Std. 802.16a; IEEE Standard for Local and metropolitan area networks; Part 16: Air Interface for Fixed Broadband Wireless Access Systems—Amendment 2: Medium Access Control Modifications and Additional Physical Layer Specifications for 2-11 GHz; Apr. 1, 2003; pp. 1-292.

Dean Takahashi; "PortalPlayer Takes A Leap", The Mercury News, Mar. 14, 2006, 3 pages.

Notification of First Office Action from the State Intellectual Property Office of PRC dated Aug. 24, 2007 for Chinese Application No. 200510007529.7; 14 pages.

Communication dated Jun. 22, 2011 for Taiwanese Patent Application No. 094101598 with First Office Action issued May 27, 2011; 13 pages.

Communication dated Aug. 3, 2011 for Japanese Patent Application No. 2005-033647 enclosing Examiner's Report to the Board; 6 pages.

* cited by examiner

COMPUTER WITH LOW-POWER SECONDARY PROCESSOR AND SECONDARY DISPLAY

CROSS-REFERENCE TO RELATED APPLICATIONS

This application is a continuation of U.S. patent application Ser. No. 10/779,544, filed Feb. 13, 2004. The disclosure of the above application is incorporated herein by reference in its entirety.

FIELD OF THE INVENTION

The present invention relates to laptop and desktop computer architectures, and more particularly to laptop and desktop computer architectures having low-power secondary processors and secondary displays for providing reduced functionality when the laptop and desktop computers are in an inactive mode.

BACKGROUND OF THE INVENTION

Referring now to FIG. 1, a typical computer architecture for a laptop or desktop computer 10 is shown. The computer 10 includes an input/output (I/O) interface 12 that communicates with one or more peripheral devices 13. The memory 16 stores data and includes random access memory (RAM), read-only memory (ROM), Flash memory, and/or any other type of electronic data storage. The memory 16 communicates with a processor, memory and graphics hub 18. The hub 18, in turn, communicates with the I/O interface 12. A processor 20 also communicates with the processor, memory and graphics hub 18 and performs data processing, calculations, and other tasks. A graphics card and/or chip 24 may be provided to accelerate graphics processing. In some implementations, the processor, memory and graphics hub 18 and/or the graphics card and/or chip 24 are omitted and/or are integrated with other components.

The computer 10 further includes a display 30, which is typically a color display. A disk drive system 34 typically includes a magnetic storage medium that stores data. The disk drive system 34 may include a hard disk controller (HDC), an embedded processor, and/or other components (not shown). One or more input/output (I/O) devices 36 such as a keyboard, a mouse, a touch pad, a scratch pad and/or other pointing and/or input devices facilitate data input, navigation and/or user interaction with the computer. A wireless network interface 38 enables wireless connectivity with a wireless network such as a wide area network, a local area network, a cellular network such as CDMA, GSM, GSM3G, GPRS systems or other cellular networks, a Bluetooth network, or any other wireless network type. For example, the wireless network interface 38 may be compliant with IEEE Section 802.11, 802.11a, 802.11b, 802.11g, and/or 802.16.

Referring now to FIG. 2, when a laptop user travels with a laptop 50, the laptop 50 may pass through hot zones 54-1 and 54-2 (collectively hot zones 54). Access points 56-1 and 56-2 (collectively access points 56) provide wireless network connectivity to a distributed communications system 58 such as the Internet in the hot zones 54-1 and 54-2, respectively. Similarly, a home zone 60 may include an access point 62 that also provides wireless access to the distributed communication system 58.

Unless the laptop 50 is turned on and booted up, the user is not able to determine whether he or she has entered a hot zone 54. As can be appreciated, booting up the laptop 50 to determine whether a hot zone 54 is available is a time-consuming process. Likewise, when the laptop user wants to check e-mail, to check securities quotes, to trade securities and/or to use other Internet services, the laptop user must boot up the laptop 50.

SUMMARY OF THE INVENTION

A computer according to the present invention includes a primary processor, a primary memory, and a primary input/output (I/O) interface that communicates with the primary processor and the primary memory. A primary display communicates with the primary I/O interface. The primary processor, the primary memory, and the primary display are operated in active and inactive modes and are powered down when the computer is in the inactive mode. A secondary processor dissipates less power than the primary processor. A secondary display communicates with the secondary processor. The secondary processor and the secondary display are powered up when the computer is in the inactive mode.

In other features, a secondary memory communicates with the secondary processor, is powered up when the computer is in the inactive mode and has a lower storage capacity than the primary memory. The secondary processor and the secondary display support Personal Digital Assistant-like functions while the computer is in the inactive mode. The computer is a laptop and the secondary display is integrated with an outer surface of the laptop.

In other features, a disk drive system communicates with the primary I/O interface. The secondary processor and the secondary memory are integrated with the disk drive system.

In still other features, a wireless network interface communicates with the primary I/O interface. The secondary processor and the secondary memory are integrated with the wireless network interface. A secondary I/O device communicates with the secondary processor. The secondary display supports touch pad operation. The computer is a desktop computer that includes an enclosure. The secondary display is integrated with the enclosure.

In other features, a system comprises the computer and further comprises a wireless network interface that communicates with the secondary processor. A distributed communications system communicates with the wireless network interface. A server communicates with the distributed communications system. An agent module is executed by the secondary processor and retrieves at least one of e-mail messages and securities data from the server.

In still other features, a hot zone module is executed by the secondary processor, identifies when the computer is in a hot zone, and provides a visual indication of the hot zone on the secondary display.

A computer according to the present invention has active and inactive modes and includes a secondary processor and a secondary display that communicates with the secondary processor. The secondary processor and the secondary display are powered when the computer is in the inactive mode and support Personal Digital Assistant-like functions while the computer is in the inactive mode.

In other features, a secondary memory communicates with the secondary processor and is powered when the computer is in the inactive mode.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
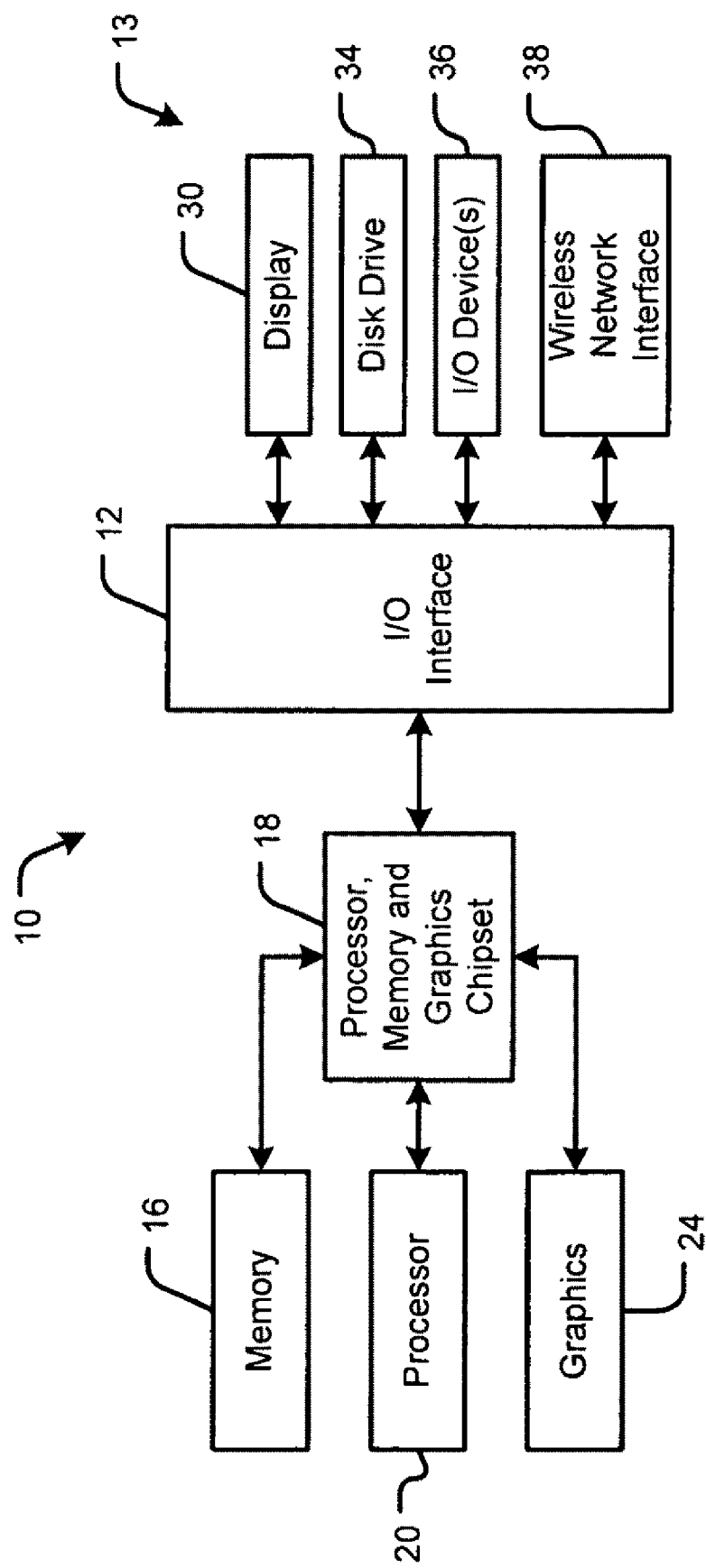
FIG. 1 is a functional block diagram of an exemplary computer architecture for laptop and desktop computers according to the prior art.
Figure 2:
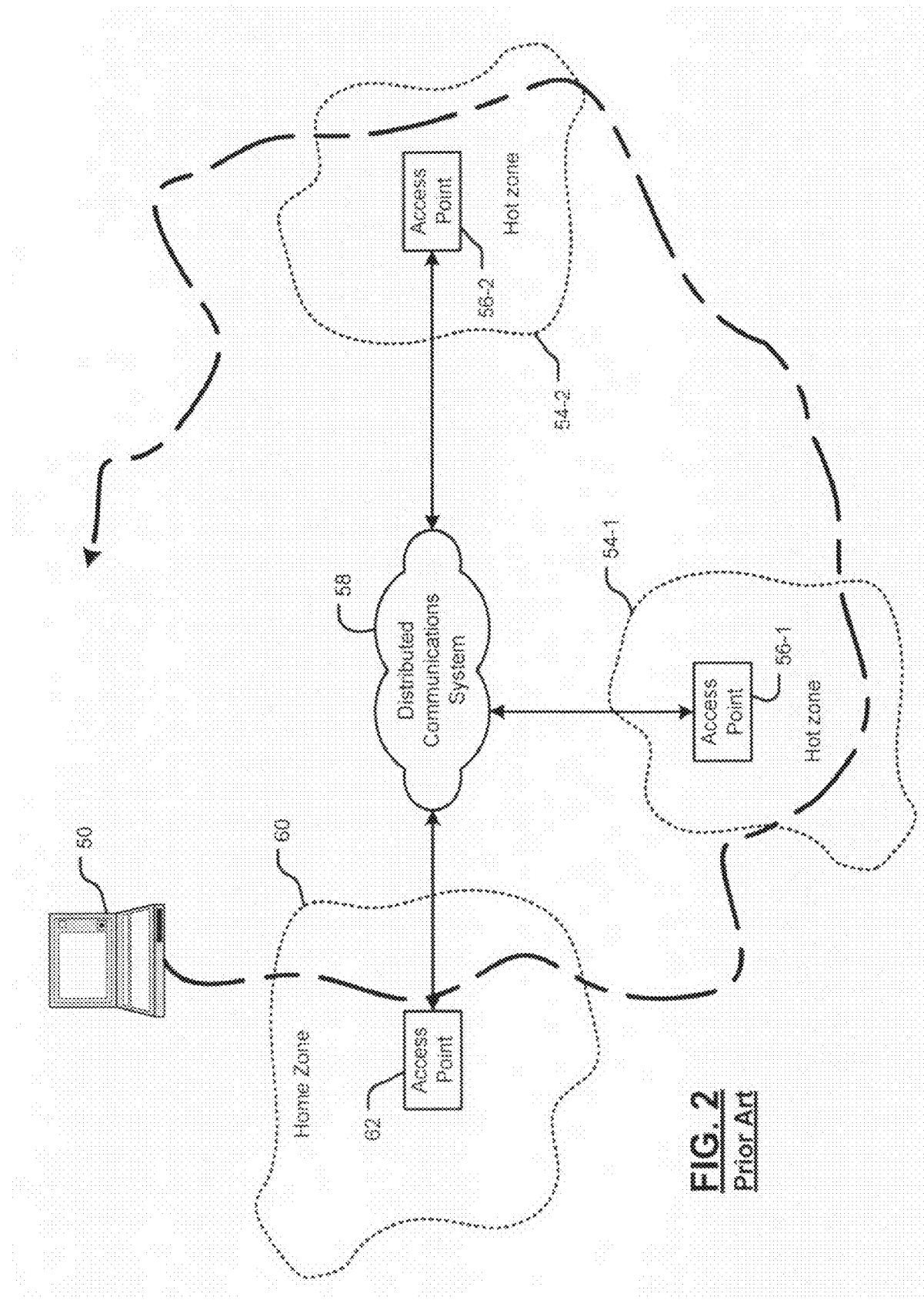
FIG. 2 illustrates a laptop computer as it travels through hot zones according to the prior art.

The following description of the preferred embodiment(s) is merely exemplary in nature and is in no way intended to limit the invention, its application, or uses. For purposes of clarity, the same reference numerals will be used in the drawings to identify similar elements. As used herein, the term module, agent and/or device refers to an application specific integrated circuit (ASIC), an electronic circuit, a software or firmware program, a processor (shared, dedicated, or group) and memory that execute one or more software or firmware programs, a combinational logic circuit, or other suitable components that provide the described functionality.

The present invention provides a novel computer architecture including a low-power secondary processor for operating a secondary display in laptop and desktop computers. The secondary processor dissipates very low power and supports a reduced set of Personal Digital Assistant-like services such as text messaging, e-mail messaging, securities quote retrieval and/or trading, hot zone identification, e-mail notification and the like when the computer is in an inactive mode. The low-power secondary processor and the secondary display are operated when the computer is in the inactive mode. As used herein, the term inactive mode refers to low-power hibernating modes, off modes and/or other modes that do not provide sufficient power to support complex processing and graphics that are normally performed by the primary processor and the primary display of the laptop and desktop computers in the active mode.

Figure 3A:
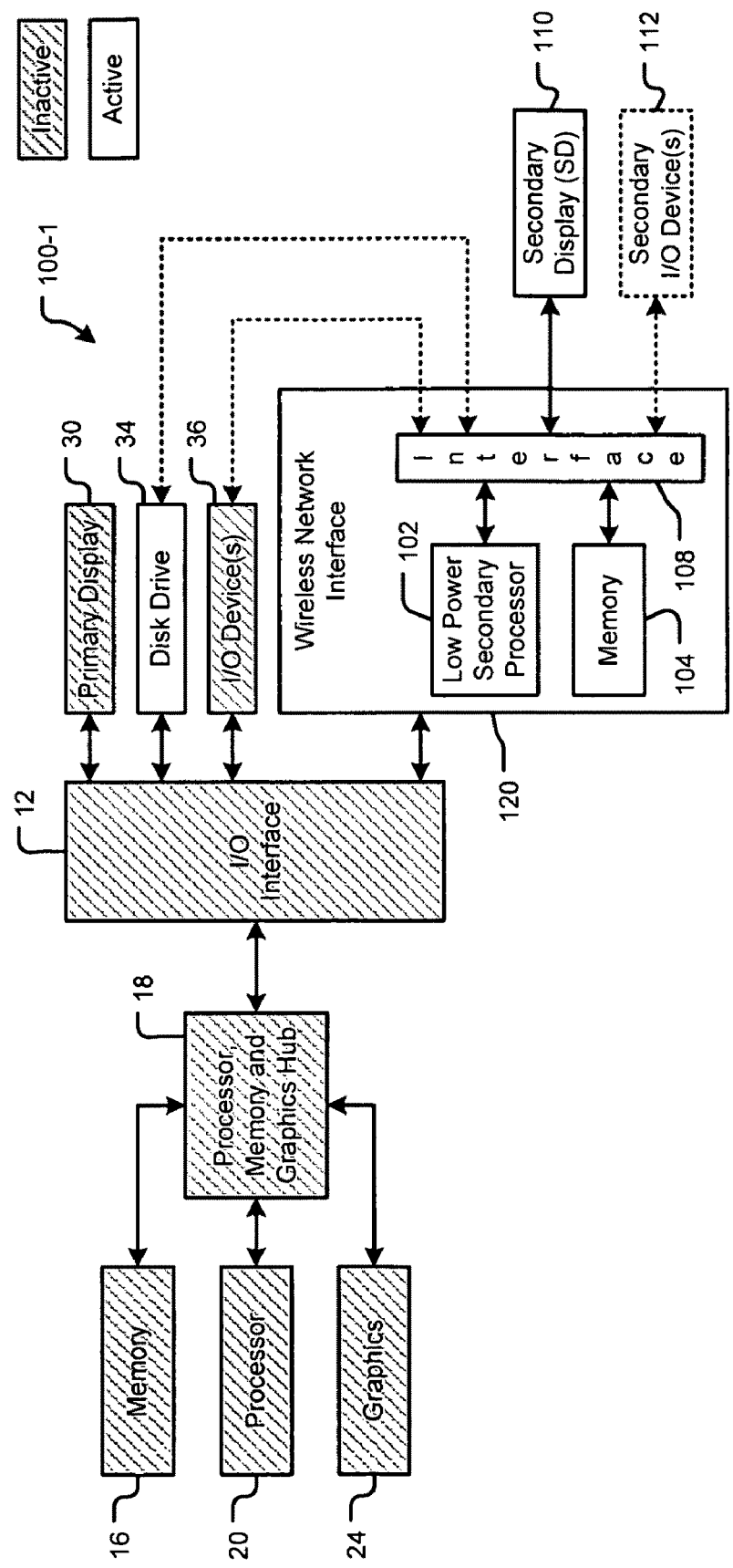
FIG. 3A is a functional block diagram of a first computer architecture for laptop and desktop computers with a secondary processor and a secondary display according to the present invention.

Referring now to FIG. 3A, in addition to the primary components described above in conjunction with FIG. 1, a computer architecture 100-1 according to the present invention further includes a low-power secondary processor 102 and secondary memory 104. The low-power secondary processor 102 and the secondary memory 104 communicate with a secondary input/output interface 108. The secondary memory 104 includes RAM, ROM, Flash, and/or any other type of electronic data storage. As can be appreciated, some or all of the primary memory 16 can be used instead of and/or in addition to the secondary memory 104.

A secondary display 110 communicates with the I/O interface 108 and supports simple graphics such as the display of text, icons and other low resolution graphics. In a preferred embodiment, the secondary display 110 preferably includes a monochrome liquid crystal display (LCD), although a color LCD or other display types may be used. The secondary display 110 may support touch screen functionality. Alternately, one or more secondary input/output devices 112 may be provided such as buttons, touch pads, scratch pads, pointing devices and the like.

In the computer architecture 100-1 that is shown in FIG. 3A, the low-power secondary processor 102, secondary memory 104, and secondary I/O interface 108 are integrated/embedded with a wireless network interface 120. The wireless network interface 120 supports a wireless network such as a wide area network, a local area network, a cellular network such as CDMA, GSM, GSM3G, GPRS systems or other cellular networks, a Bluetooth network, or any other wireless network type. For example, the wireless network interface 38 may be compliant with IEEE Section 802.11, 802.11a, 802.11b, 802.11g, and/or 802.16, which are hereby incorporated by reference in their entirety. In other words, the secondary processor 102 also supports wireless network functionality in addition to the functionality that is described above and that is enabled when the computer is in the inactive mode. Alternatively, the wireless network interface 120 may include another processor that supports wireless network functionality in addition to the secondary processor 102.

Figure 3B:
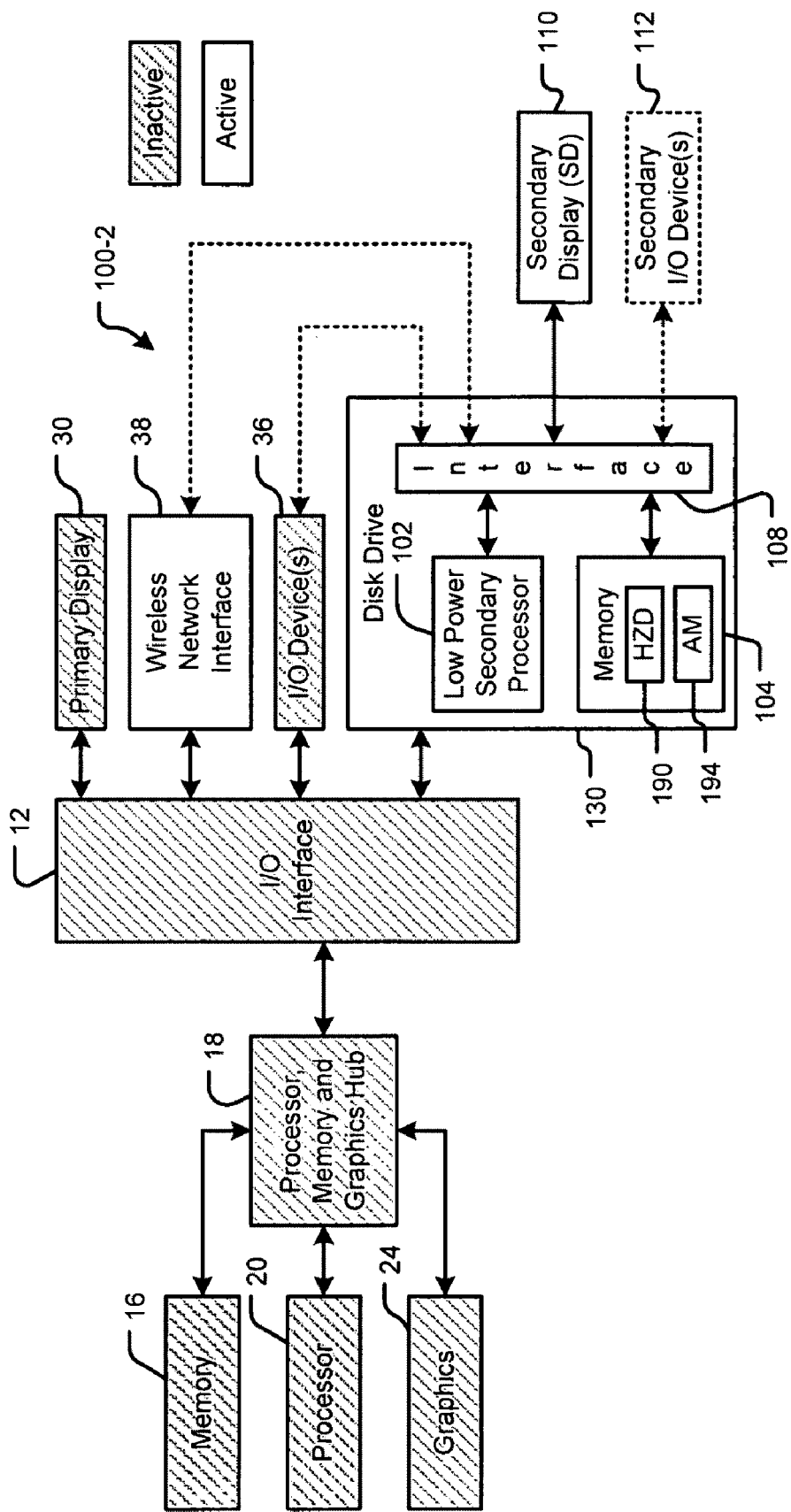
FIG. 3B is a functional block diagram of a second computer architecture for laptop and desktop computers with a secondary processor and a secondary display according to the present invention.

In the computer architecture 100-2 that is shown in FIG. 3B, the low-power secondary processor 102, secondary memory 104, and secondary I/O interface 108 are integrated/embedded with a system on chip (SOC) (including a hard disk drive (HDD) and read channel) of a disk drive system 130. In other words, the secondary processor 102 also supports disk drive functionality in addition to other functionality that is described above and that is enabled when the computer is in the inactive mode. Alternatively, the disk drive system 130 may have dedicated processor in addition to the secondary processor 102.

Figure 3C:
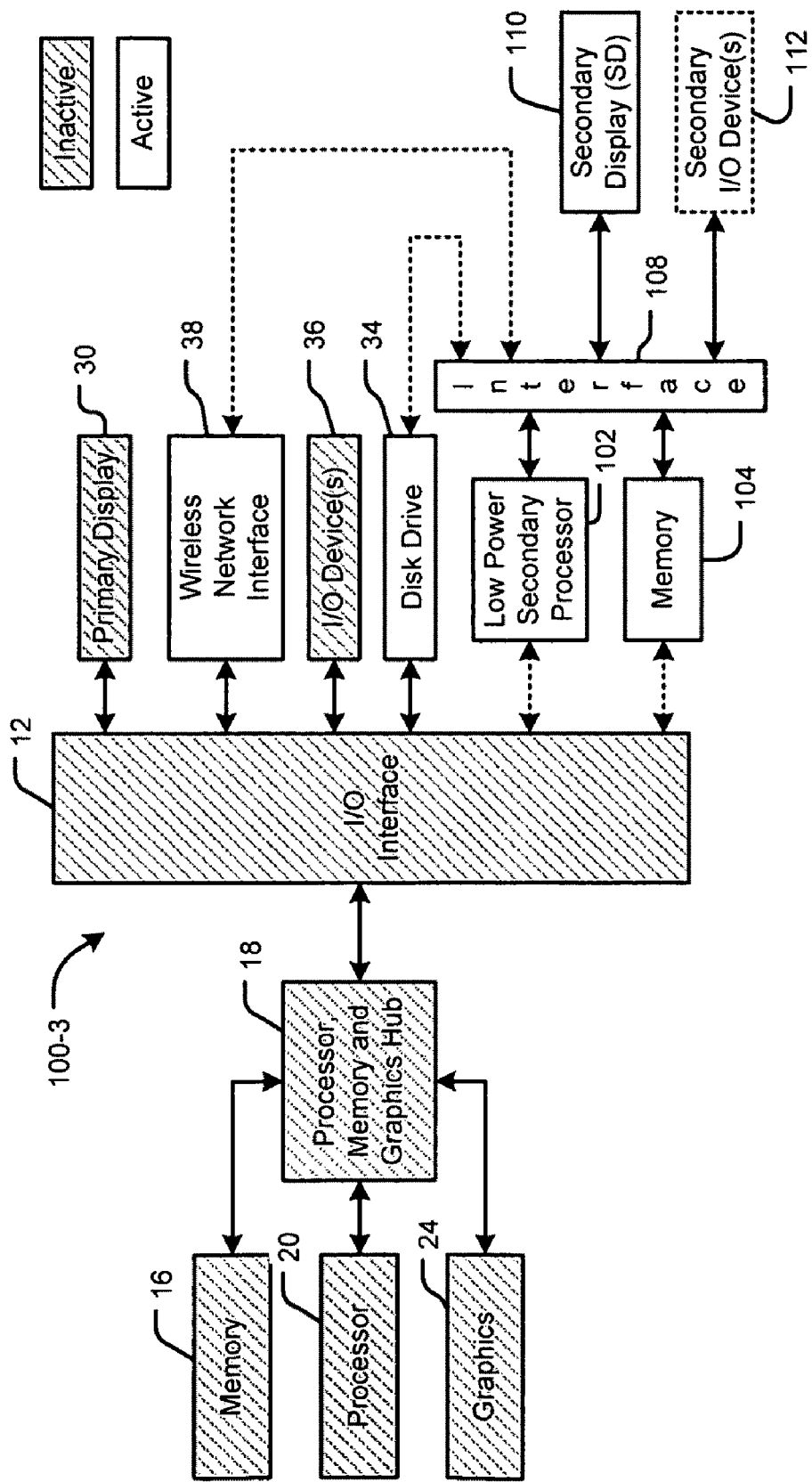
FIG. 3C is a functional block diagram of a third computer architecture for laptop and desktop computers with a secondary processor and a secondary display according to the present invention.

In the computer architecture 100-3 that is shown in FIG. 3C, the low-power secondary processor 102, memory 104, and interface 108 are not embedded in or otherwise integrated with other system components.

In the computer architecture 100-1 that is shown in FIG. 3A, the primary memory 16, primary processor 20, graphics 24, hub 18, and primary display 30 are in the inactive mode. The wireless network interface 120, low-power secondary processor 102, secondary memory 104, secondary I/O interface 108, secondary display 110, and secondary I/O devices 112 are powered and support the desired reduced functionality. The I/O interface 12 may be either inactive (as shown) or active. The disk drive system 34 may be powered as needed to store and retrieve data or not powered during the inactive mode. If the disk drive system 34 is not powered during the inactive mode, the secondary memory 104 should have a sufficient size to support the desired reduced functionality.

In the computer architecture 100-2 that is shown in FIG. 3B, the primary memory 16, primary processor 20, graphics 24, hub 18, and primary display 30 are inactive. The wireless network interface 120, low-power secondary processor 102, secondary memory 104, secondary I/O interface 108, secondary display 110, disk drive system 34 and secondary I/O devices 112 are powered and support the desired reduced functionality. The I/O interface 12 may be either inactive (as shown) or active.

In the computer architecture 100-3 that is shown in FIG. 3C, the primary memory 16, primary processor 20, graphics 24, hub 18, and primary display 30 are inactive. The wireless network interface 120, low-power secondary processor 102, secondary memory 104, secondary I/O interface 108, secondary display 110, and secondary I/O devices 112 are powered and support the desired reduced functionality. The I/O interface 12 may be either inactive (as shown) or active. The disk drive system 34 may be powered as needed to store and retrieve data or not powered during the inactive mode. If the disk drive system 34 is not powered during the inactive mode, the secondary memory 104 should have a sufficient size to support the desired reduced functionality.

The low-power secondary processors 102 of the computer architectures 100 have sufficient processing power to drive the secondary displays 110. The secondary processors 102 also handle input and output events via the secondary I/O device(s) 112. The secondary processors 102 also preferably execute hot zone detecting (HZD) modules 190 (for example, shown in FIG. 3B) that sense hot zones and generate an icon, text or other visual message on the secondary display 110 to notify the user of the hot zone.

The secondary processors 102 may also execute agent modules 194 (for example, shown in FIG. 3B) that access and retrieve securities quotes, e-mail, and the like from servers that are associated with the distributed communications system. The agent modules 194 may also generate scrolling banners, icons, text or other visual messages on the secondary display 110 using the information that is retrieved. The user may also use the I/O devices 112 and/or touch pad to perform personal digital assistant -like (PDA-like) tasks such as to retrieve and respond to e-mails, to retrieve securities quotes, to perform securities trades, and/or other similar tasks.

Figure 4A:
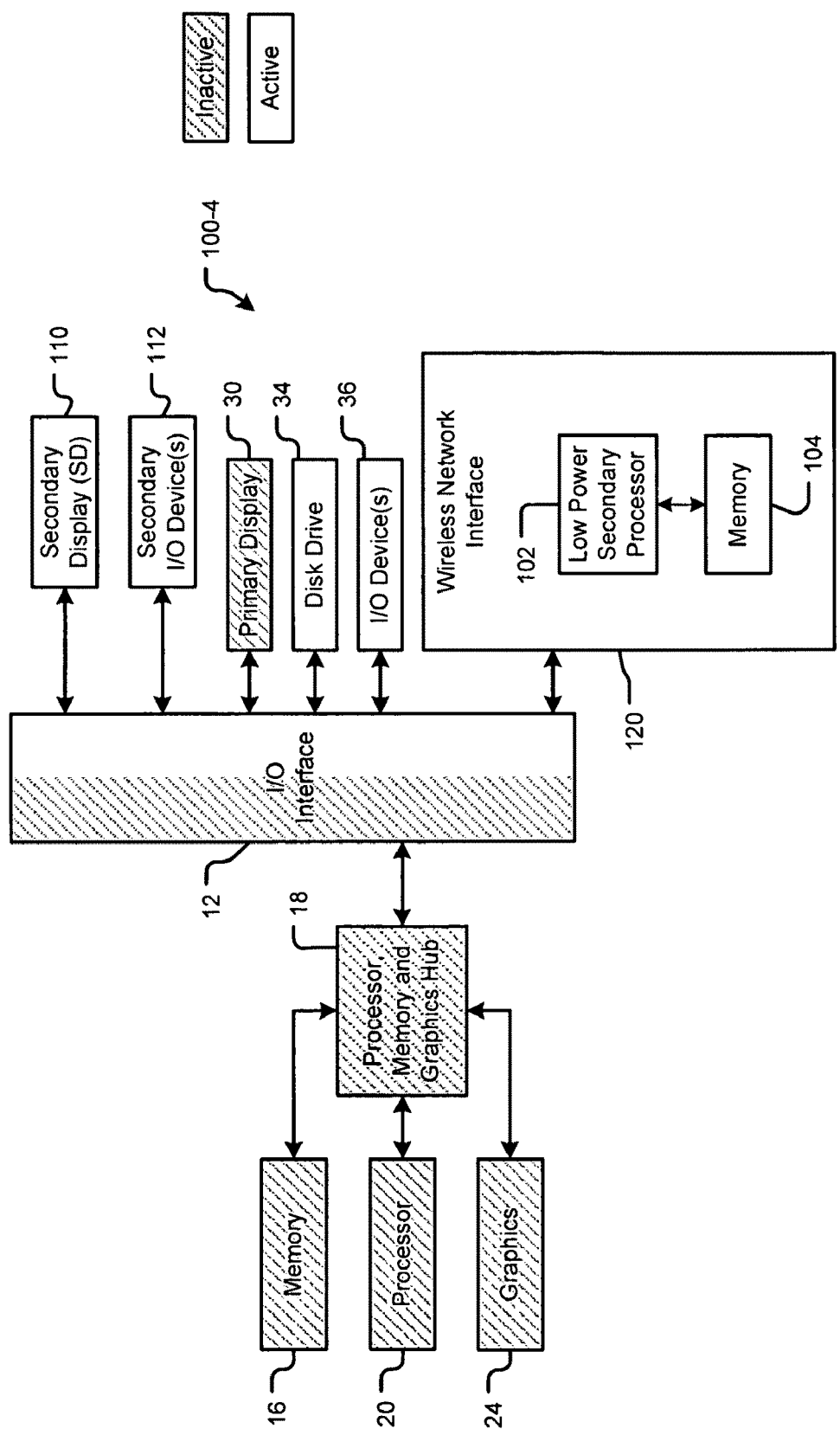
FIG. 4A is a functional block diagram of a fourth computer architecture that is similar to FIG. 3A and that powers the primary I/O interface during the inactive mode according to the present invention.

Referring now to FIG. 4A, instead of using a secondary I/O interface 108 as shown in FIG. 3A during the inactive mode, the computer architecture 110-4 employs the primary I/O interface 12 during the inactive mode. When transitioning to the inactive mode, the primary I/O interface 12 remains fully or at least partially powered so that it can support the secondary functions. The secondary display 110 and the secondary I/O devices 112 communicate with the low power secondary processor 102 and memory 104, which are integrated/embedded with the wireless network interface 120, through the primary I/O interface 12. The disk drive 34 and/or the I/O devices 36 may also be powered during the inactive mode and may communicate with the low power secondary processor 102 and memory 104 through the primary I/O interface 12. If the primary I/O devices 36 are powered, the secondary I/O devices 112 may optionally be omitted. For example, a primary keyboard, mouse and/or other primary I/O device may be used for user interaction during the inactive mode.

Figure 4B:
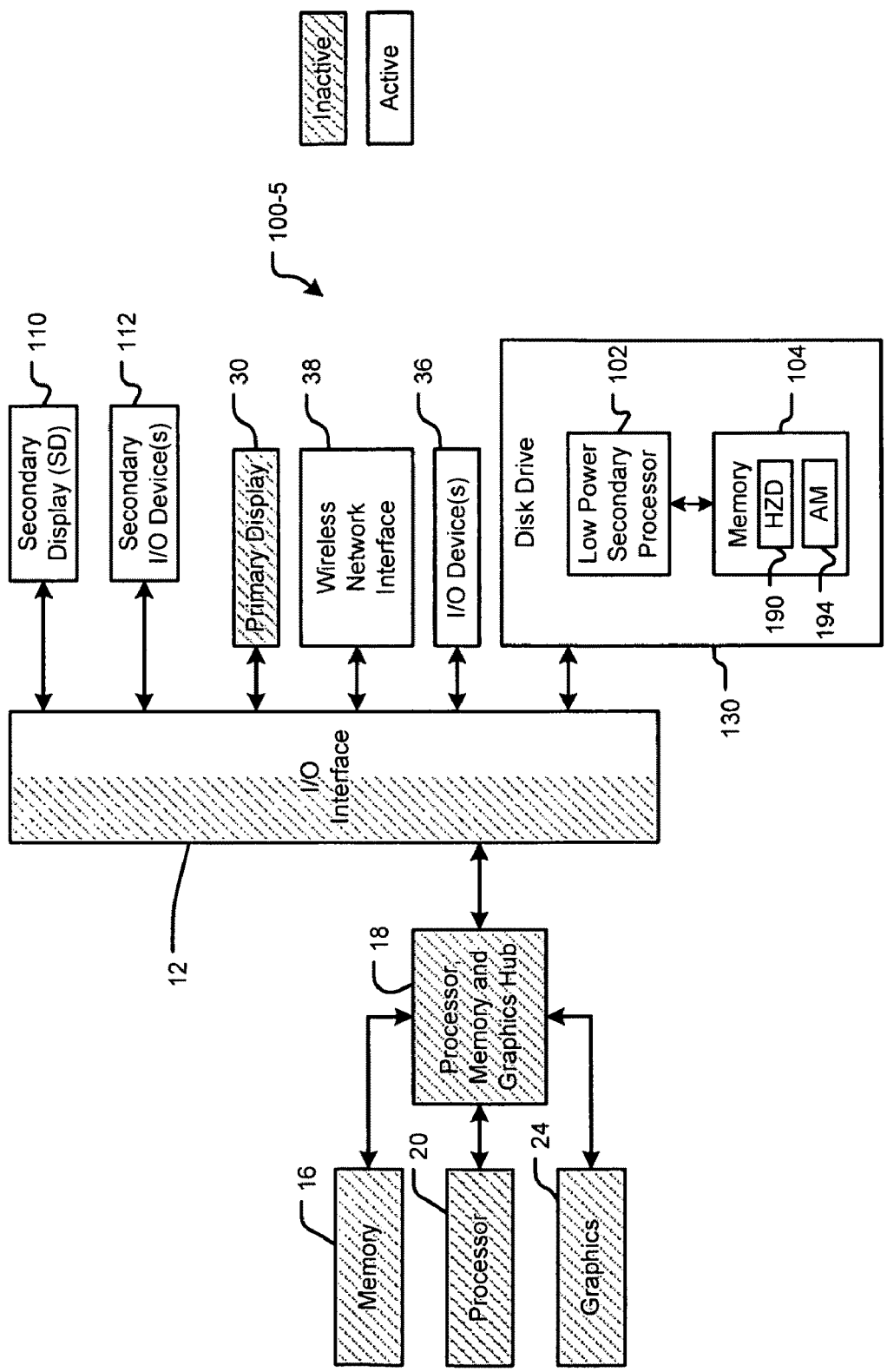
FIG. 4B is a functional block diagram of a fifth computer architecture that is similar to FIG. 3B and that powers the primary I/O interface during the inactive mode according to the present invention.

Referring now to FIG. 4B, instead of using a secondary I/O interface 108 as shown in FIG. 3B during the inactive mode, the computer architecture 110-5 employs the primary I/O interface 12 during the inactive mode. When transitioning to the inactive mode, the primary I/O interface 12 remains fully or at least partially powered so that it can support the secondary functions. The secondary display 110 and the secondary I/O devices 112 communicate with the low power secondary processor 102 and memory 104, which are integrated/embedded with the disk drive 130, through the primary I/O interface 12. The wireless network interface 38 and/or the I/O devices 36 may also be powered during the inactive mode and may communicate with the low power secondary processor 102 and memory 104 through the primary I/O interface 12. If the primary I/O devices 36 are powered, the secondary I/O devices 112 may optionally be omitted. For example, the primary keyboard, mouse and/or other primary I/O device may be used for user interaction during the inactive mode.

Figure 4C:
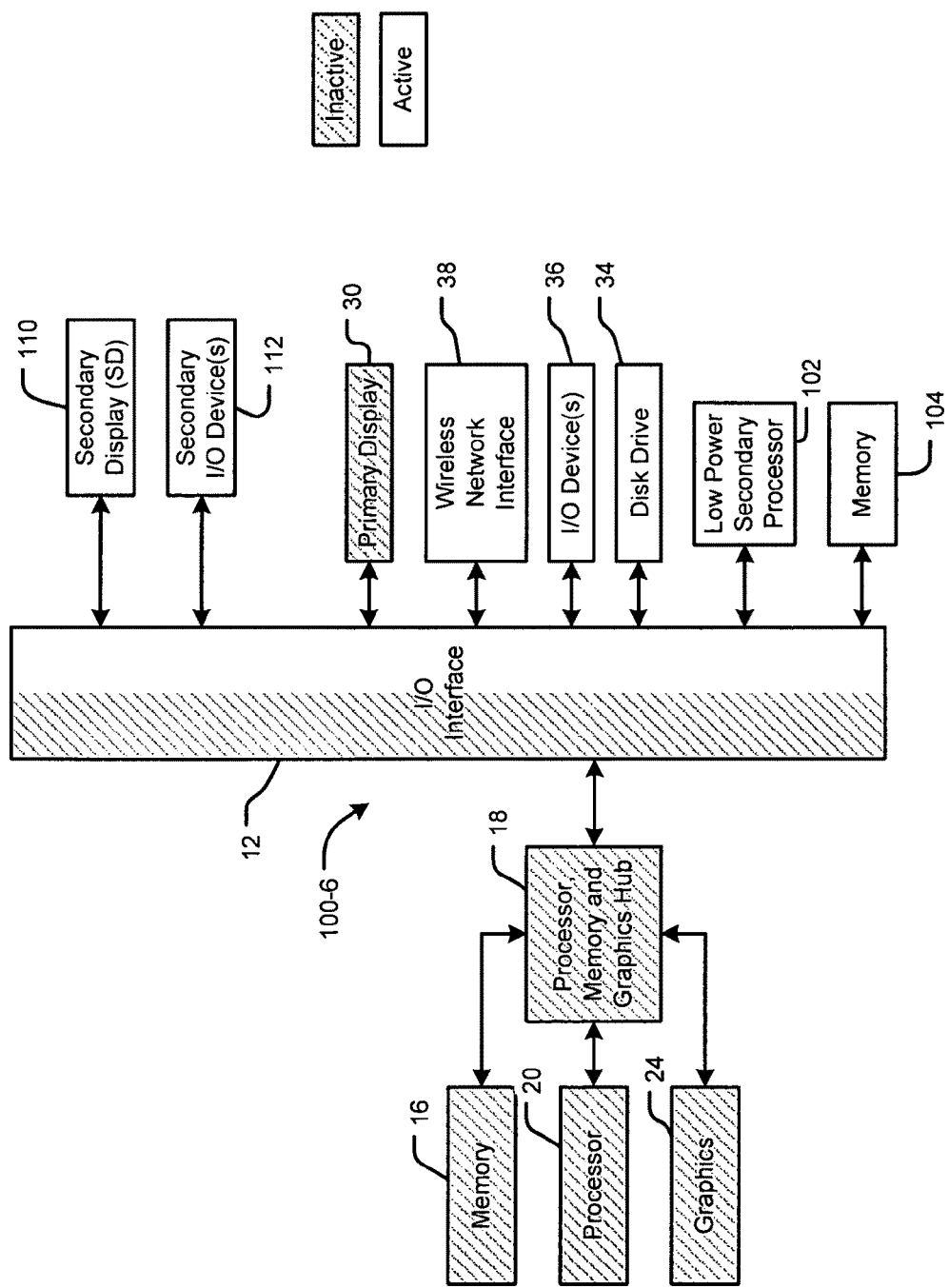
FIG. 4C is a functional block diagram of a sixth computer architecture that is similar to FIG. 3C and that powers the primary I/O interface during the inactive mode according to the present invention.

Referring now to FIG. 4C, instead of using a secondary I/O interface 108 as shown in FIG. 3C during the inactive mode, the computer architecture 110-6 employs the primary I/O interface 12 during the inactive mode. When transitioning to the inactive mode, the primary I/O interface 12 remains fully or at least partially powered so that it can support the secondary functions. The secondary display 110 and the secondary I/O device 112 communicate with the low power secondary processor 102 and memory 104 through the primary I/O interface 12. The disk drive 34, the wireless network interface 38 and/or the I/O devices 36 may also be powered during the inactive mode and may communicate with the low power secondary processor 102 and memory 104 through the primary I/O interface 12. If the primary I/O devices 36 are powered, the secondary I/O devices 112 may optionally be omitted. For example, the primary keyboard, mouse and/or other primary I/O device may be used for user interaction during the inactive mode.

Figure 5C:
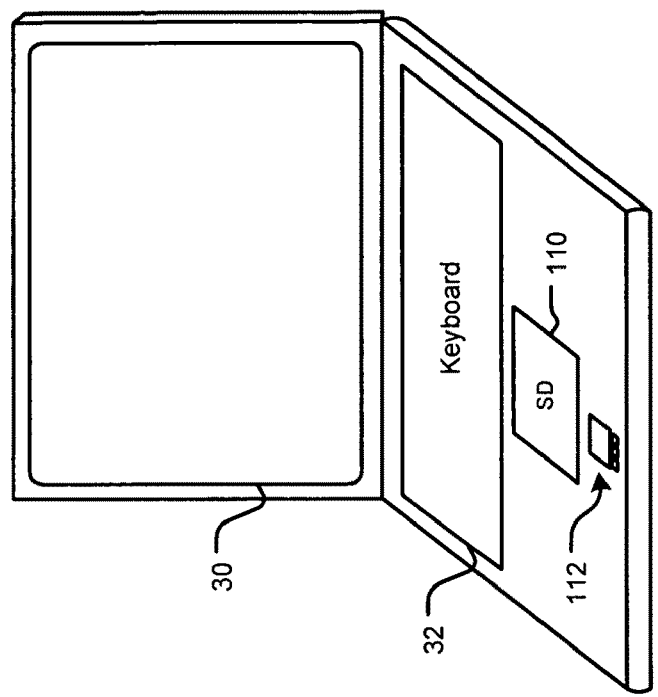
FIG. 5C is a perspective view of a laptop computer including a secondary display mounted inside of the laptop adjacent to the keyboard according to the present invention.
Figure 5A:
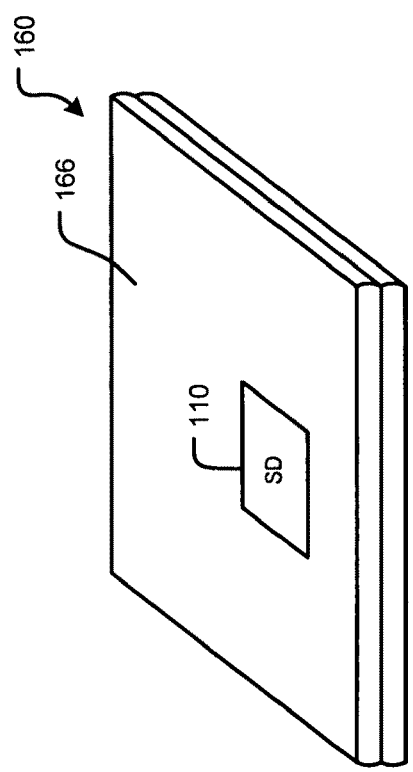
FIG. 5A is a perspective view of a laptop computer including a secondary display according to the present invention.
Figure 5B:
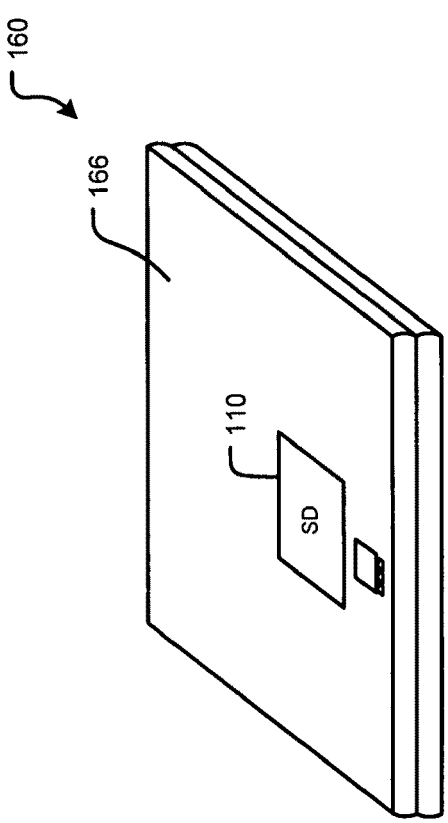
FIG. 5B is a perspective view of a laptop computer including a secondary display and a secondary input/output device according to the present invention.

Referring now to FIGS. 5A, 5B and 5C, a laptop computer 160 according to the present invention includes the secondary display 110. For example, the secondary display 110 can be arranged on a top side 166 of the laptop computer 160. Skilled artisans will appreciate that the secondary display 110 may be located in many other locations on the laptop 160 including, but not limited to, the front edges, inside of the laptop adjacent to the keyboard, or in any other suitable location. Referring now to FIG. 5B, secondary I/O devices 170 may be provided such as but not limited to buttons, a scratch pad, a pointing device, a keyboard, a mini key pad, an alphanumeric key pad similar to a telephone and/or other devices. The secondary I/O devices 170 are located adjacent to the secondary display 110. In FIG. 5C, the secondary display 110 is located adjacent to the keyboard on the inside of the laptop. Still other locations will be readily apparent.

Figure 6A:
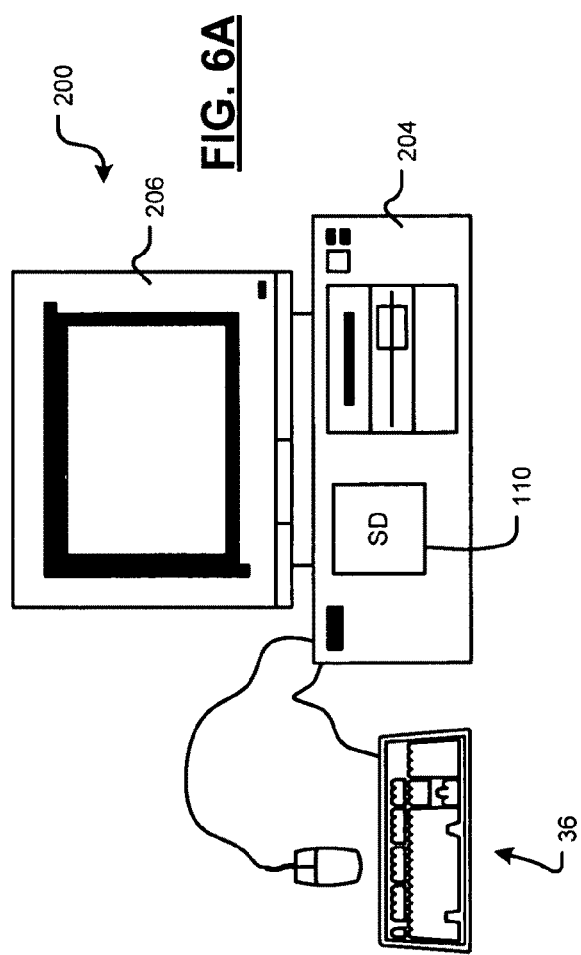
FIG. 6A illustrates a front view of a desktop computer including an integrated secondary display according to the present invention.
Figure 6B:
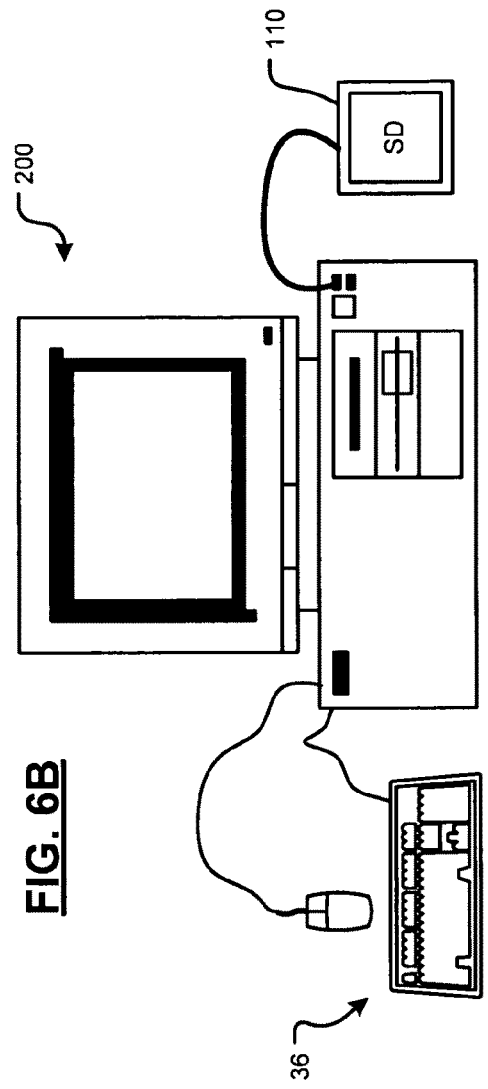
FIG. 6B illustrates a front view of a desktop computer including a peripheral secondary display according to the present invention.

Referring now to FIGS. 6A and 6B, a desktop computer 200 includes the secondary display 110, which can be integrated with a computer enclosure 204 as shown. Skilled artisans will appreciate that there are a variety of other suitable locations on the enclosure 204, the keyboard (or other I/O device) and/or the monitor 206 for the secondary display 110. In FIG. 6B, the secondary display 110 is connected as a peripheral device to the desktop computer 200. The secondary display 110 can also be connected to a laptop computer as a peripheral device as well. In this embodiment, the low power secondary processor 102, the secondary memory 104 and/or the secondary I/O interface 108 may also be associated with the peripheral secondary display 110.

Figure 7:
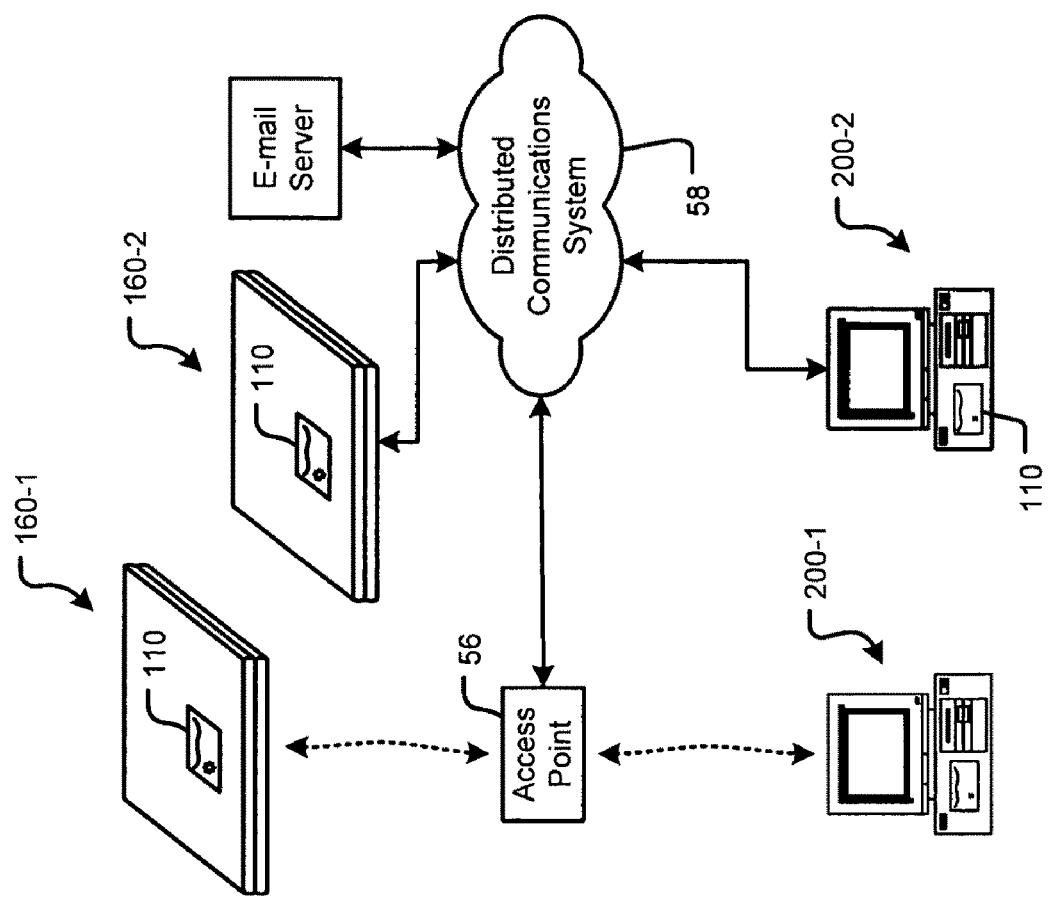
FIG. 7 illustrates laptop and desktop computers with secondary displays that are directly and/or wirelessly connected to a distributed communication system and a server.

Referring now to FIG. 7, the secondary processors 102 and secondary displays 110 that are associated with the laptop and desktop computers can be operated in a network, for example, wirelessly via the access point 56 and/or directly connected to the distributed communications system 58. The secondary processors 102 and secondary displays 110 provide the reduced set of services without requiring the laptop or desktop computer to be booted up.

The secondary display and other components that are operated when the primary components are inactive may be powered by the battery that powers the laptop and/or via a secondary battery (not shown). In one embodiment, the secondary battery is recharged by the main battery during the active mode.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A computer having an active mode and an inactive mode, the computer comprising:
   a primary processor;
   a primary memory;
   a primary display associated with the primary processor and the primary memory, wherein the primary processor, the primary memory, and the primary display are operated when the computer is in the active mode and are powered down when the computer is in the inactive mode;
   a wireless network interface configured to transmit and receive wireless network data;
   a secondary processor integrated with the wireless network interface, the secondary processor configured to dissipate less power than the primary processor; and
   a secondary display configured to communicate with the secondary processor, wherein i) the secondary processor and the secondary display are powered up when the computer is in the inactive mode, and ii) the secondary processor is configured to process the wireless network data when the computer is in each of the active mode and the inactive mode.

2. The computer of claim 1, further comprising a secondary memory configured to communicate with the secondary processor, wherein the secondary memory i) is powered up when the computer is in the inactive mode and ii) has a lower storage capacity than the primary memory.

3. The computer of claim 1, wherein the secondary processor and the secondary display are configured to support at least one of text messaging, e-mail delivery, securities quote retrieval, and hot zone identification while the computer is in the inactive mode.

4. The computer of claim 1, wherein i) the computer is a laptop and ii) the secondary display is integrated with an outer surface of the laptop.

5. The computer of claim 1, further comprising:
   a primary input/output (I/O) interface configured to communicate with the primary processor and the primary memory; and
   a secondary I/O device configured to communicate with the secondary processor.

6. The computer of claim 1, wherein the secondary display is configured to support touch pad operation.

7. The computer of claim 1, wherein i) the computer is a desktop computer that includes an enclosure and ii) the secondary display is integrated with the enclosure.

8. A system comprising the computer of claim 1, wherein the system further comprises:
   a wireless network interface configured to communicate with the secondary processor;
   a distributed communications system configured to communicate with the wireless network interface;
   a server configured to communicate with the distributed communications system; and
   an agent module that is executed by the secondary processor, wherein the agent module is configured to retrieve at least one of e-mail messages and securities data from the server.

9. The computer of claim 1, further comprising a hot zone module that is executed by the secondary processor, wherein the hot zone module is configured to i) identify when the computer is in a hot zone and ii) provide a visual indication of the hot zone on the secondary display.

10. The computer of claim 1, further comprising a graphics processor, wherein the graphics processor is powered down when the computer is in the inactive mode.

11. The computer of claim 2, further comprising:
    a primary battery; and
    a secondary battery, wherein the primary battery is configured to power the primary processor, the primary memory, and the primary display and the secondary battery is configured to power the secondary processor and the secondary memory.

12. The computer of claim 11, wherein the primary battery is configured to charge the secondary battery when the computer is in the active mode.

13. A method of operating a computer in an active mode and an inactive mode, the method comprising:
    operating a primary processor, a primary memory, and a primary display of the computer when the computer is in the active mode;
    powering down the primary processor, the primary memory, and the primary display when the computer is in the inactive mode;
    transmitting and receiving wireless network data using a wireless network interface of the computer;
    operating a secondary processor and a secondary display when the computer is in the inactive mode, wherein the secondary processor is i) integrated with the wireless network interface and ii) configured to dissipate less power than the primary processor; and
    processing the wireless network data using the secondary processor when the computer is in each of the active mode and the inactive mode.

14. The method of claim 13, further comprising:
providing secondary memory configured to communicate with the secondary processor, wherein the secondary memory has a lower storage capacity than the primary memory; and
powering up the secondary memory when the computer is in the inactive mode.

15. The method of claim 13, wherein the secondary processor and the secondary display are configured to support at least one of text messaging, e-mail delivery, securities quote retrieval, and hot zone identification while the computer is in the inactive mode.

16. The method of claim 13, wherein the secondary display is configured to support touch pad operation.

17. The method of claim 13, further comprising:
executing an agent module with the secondary processor; and
retrieving at least one of e-mail messages and securities data from a server with the agent module.

18. The method of claim 13, further comprising:
executing a hot zone module with the secondary processor;
identifying when the computer is in a hot zone; and
visually indicating the hot zone on the secondary display.

19. The method of claim 13, further comprising powering down a graphics processor of the computer when the computer is in the inactive mode.

20. The method of claim 14, further comprising:
powering the primary processor, the primary memory, and the primary display with a primary battery; and
powering the secondary processor and the secondary memory with a secondary battery.

21. The method of claim 20, further comprising charging the secondary battery with the primary battery when the computer is in the active mode.

* * * * *